(12) United States Patent
Kim et al.

(10) Patent No.: US 7,103,241 B2
(45) Date of Patent: Sep. 5, 2006

(54) OPTICAL SWITCHING DEVICE

(75) Inventors: Jong-Kwon Kim, Taejonkwangyok-shi (KR); Ki-Cheol Lee, Suwon-shi (KR); Jun-Ho Koh, Suwon-shi (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 206 days.

(21) Appl. No.: 10/686,821

(22) Filed: Oct. 16, 2003

(65) Prior Publication Data

US 2004/0208420 A1    Oct. 21, 2004

(30) Foreign Application Priority Data

Apr. 19, 2003    (KR)    ............... 10-2003-0024891

(51) Int. Cl.
*G02B 6/26*    (2006.01)
(52) U.S. Cl. .......................... 385/16; 385/17; 385/18
(58) Field of Classification Search ............... 385/16, 385/17, 18
See application file for complete search history.

(56) References Cited

U.S. PATENT DOCUMENTS 5,448,660 A * 9/1995 Calvani et al. ............... 385/21
6,310,994 B1 * 10/2001 Jones et al. .................. 385/24
6,519,064 B1 * 2/2003 Fatehi et al. ................. 398/84
6,943,925 B1 * 9/2005 Islam .......................... 359/108
2001/0048540 A1 * 12/2001 Konishi ....................... 359/180

* cited by examiner

*Primary Examiner*—Kaveh Kianni
(74) *Attorney, Agent, or Firm*—Cha & Reiter, L.L.C.

(57) ABSTRACT

An optical switching device has a plurality of input ports, and a plurality of output ports, that uses only circulators and reflectors to perform optical switching. A plurality of circulators each having a plurality of ports while operating to output an optical signal are input to a higher-order port thereof, to a lower-order port thereof arranged adjacent to the higher-order port. Each of the circulators being connected at a highest-order port thereof to an associated one of the input ports, at a lowest-order port thereof to an associated one of the output ports, and at each intermediate port thereof to a corresponding intermediate port of another one of the circulators. A plurality of reflectors each of which is adapted to reflect an optical signal, inputted thereto, or to allow the optical signal to pass there through. Each of the reflectors being connected between two intermediate ports of every two of the circulators connected to each other at the two intermediate ports. An optical signal input to an associated one of the input ports is output to an associated one of the output ports via at least one of the circulators.

6 Claims, 5 Drawing Sheets

FIG.1

(PRIOR ART)

OPTICAL SWITCHING DEVICE

CLAIM OF PRIORITY

This application claims priority to an application entitled "OPTICAL SWITCHING DEVICE," filed in the Korean Intellectual Property Office on Apr. 19, 2003 and assigned Ser. No. 2003-24891, the contents of which are hereby incorporated by reference.

BACKGROUND OF THE INVENTION

1. Field of the Invention

The present invention relates to an optical communication system. More particularly, the present invention relates to an optical switching device provided at the optical communication system to variably set the travel path of optical signals.

2. Description of the Related Art

Recently, there has been shown the practical use of a wavelength division multiplexing (WDM) technique adapted to transmit a plurality of channels having different wavelengths through a single-core optical fiber. This technique has made it possible to transmit large quantities of data at high speed. Also, optical switching for optically setting travel paths of optical signals has been possible in accordance with development of optical element manufacturing techniques. As a result, construction of a WDM type optical communication network has become possible.

For such a WDM type optical communication network, it would be best to use a mesh type communication network. The mesh type communication network uses an optical switching device, such as an optical cross-connect device, for operation. The optical switching device serves to transmit an optical signal, received through an input port, to a one predetermined output port selected from a plurality of output ports. In the case where the optical switching device receives an optical signal multiplexed with a plurality of channels, there should be control such that each channel is independently switched without being influenced by other channels.

Figure 1:
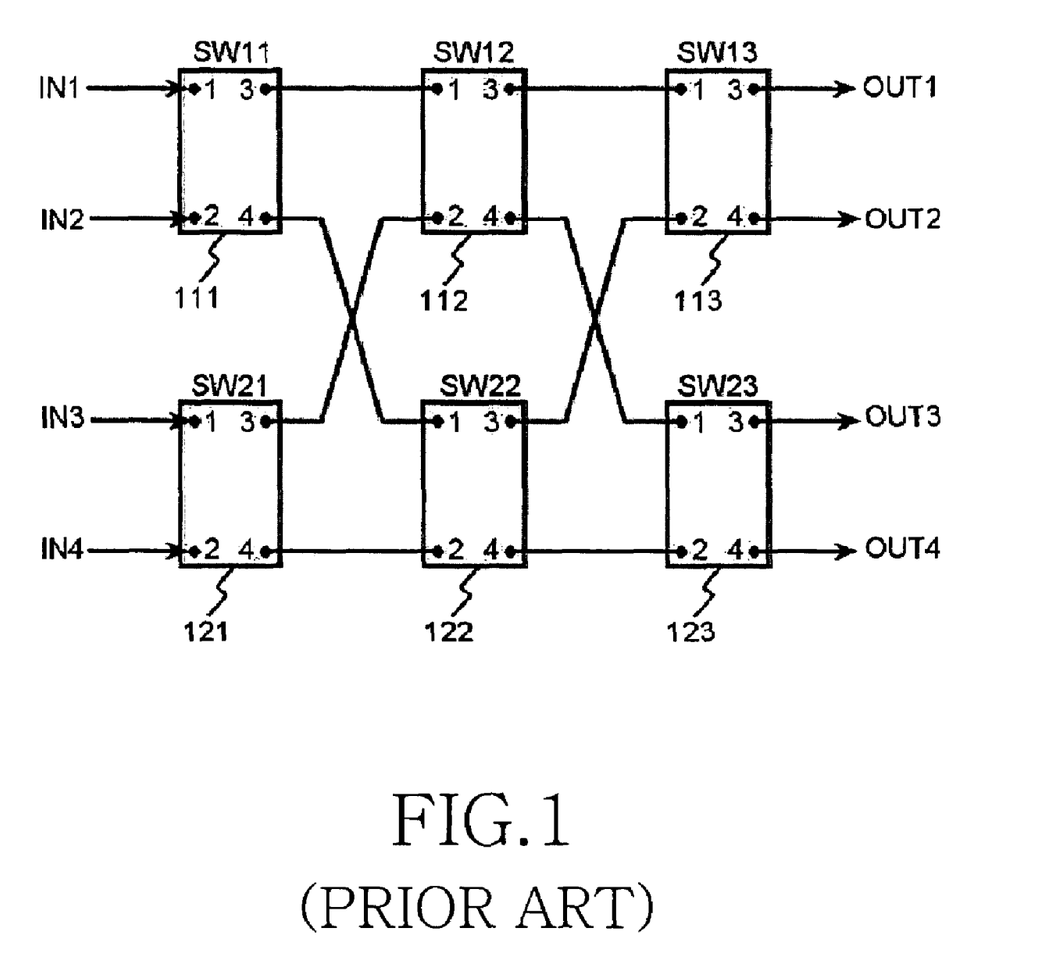
FIG. 1 is a block diagram illustrating an example of a conventional 4×4 optical switching device.
Figure 2:
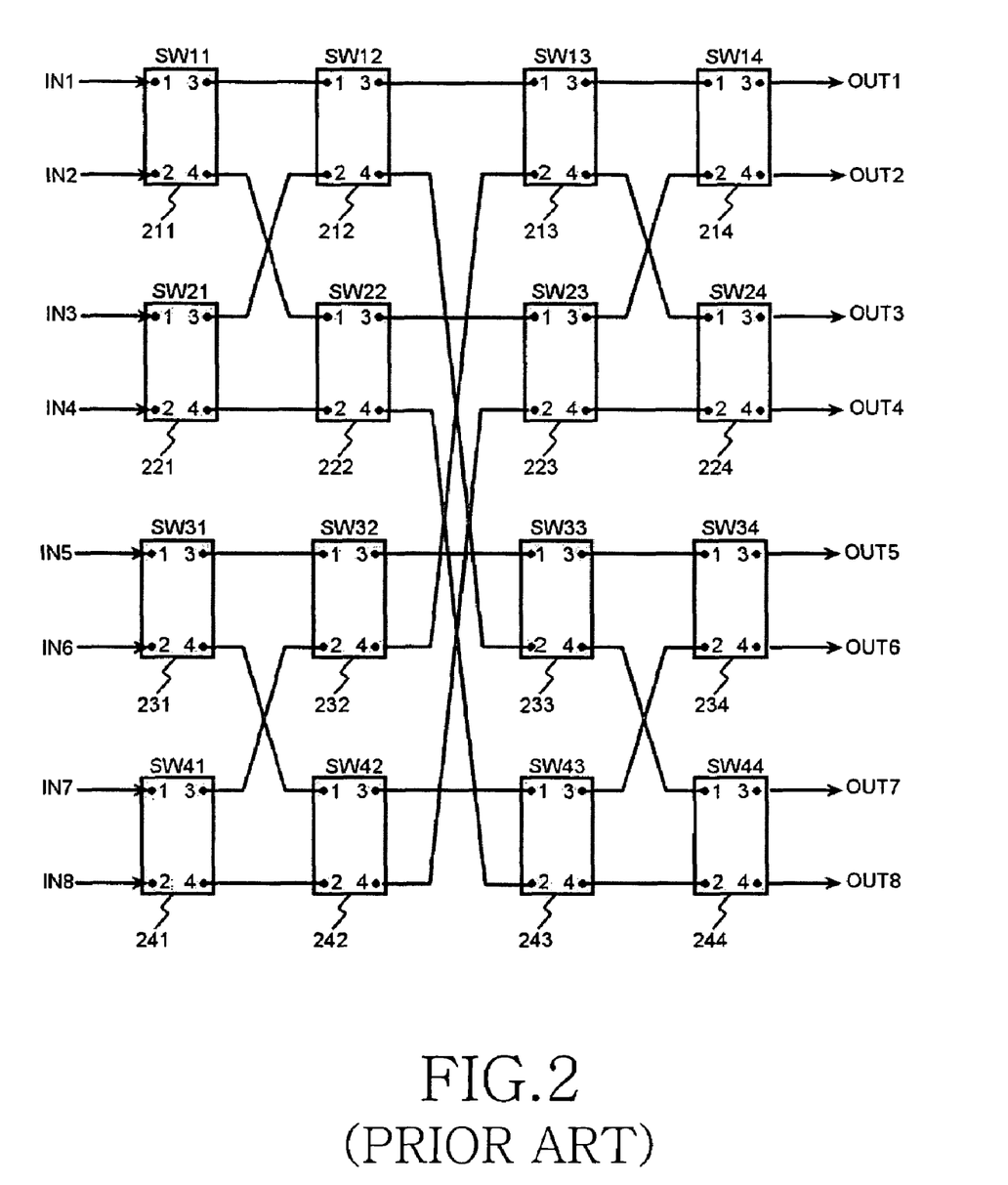
FIG. 2 is a block diagram illustrating an example of a conventional 8×8 optical switching device.

Typically, conventional optical switching devices include a plurality of switches, as shown in FIGS. 1 and 2. In the cases of FIGS. 1 and 2, the switches 111 to 123 are illustrated as being arranged in a matrix array, for explanatory purposes. Also, each switch is designated by its row number and its column number. For example, the switch 111, which is arranged on the first row and the first column, is referred to as "SW11 switch", and the switch 122, which is arranged on the second row and the second column is referred to as "SW22 switch". Each of the switches 111 to 123 has a plurality of ports. Where it is assumed that one switch is designated by a reference numeral "###", its N-th port is designated by "N" in the drawings while being designated, in the following description, by a reference numeral "###N".

FIG. 1 is a block diagram illustrating an example of a conventional 4×4 optical switching device. This optical switching device has first through fourth input ports IN1 to IN4, and first through fourth output ports OUT1 to OUT4. The optical switching device includes 6 switches 111 to 123 arranged to have a 2×3 matrix array. Each of the switches 111 to 123 is connected to another switch arranged on the same row in the matrix array while being connected to another switch arranged on a row adjacent thereto in the matrix array. Each of the switches 111 to 123 has first and second ports at an input side thereof, and third and fourth ports at an output side thereof. Each switch is switched between a "cross" state and a "bar" state in accordance with a control signal from a control unit (not shown).

For example, when the SW11 switch 111 is in a bar state, it outputs an optical signal, inputted thereto at its first port 1111 (designating switch 111, port 1 or 1111), at its third port 1113 (switch 111, port 3, referred to as 1113), while outputting an optical signal, inputted thereto at its second port 1112, at its fourth port 1114. On the other hand, when the SW11 switch 111 is in a cross state, it outputs an optical signal, inputted thereto at its first port 1111, at its fourth port 1114, while outputting an optical signal, inputted thereto at its second port 1112, at its third port 1113. The control unit controls the switches 111 to 123 in order to output an optical signal, inputted to an optional input port of the optical switching device, to an associated output port.

For example, the case in which an optical signal is input to the first input port IN1 is required to be output to the second output port OUT2 as will be described hereinafter. In this case, the control unit maintains the SW11 switch 111 in its cross state, while maintaining the SW22 switch 122 and SW13 switch 113 in their bar state.

Accordingly, it can be seen that the optical signal inputted to the first input port IN1, that is, the first port 1111 of the SW11 switch 111, is outputted to the fourth port 1114 of the SW11 switch 111 which, in turn, applies the optical signal to the first port 1221 of the SW22 switch 122. The optical signal inputted to the first port 1221 of the SW22 switch 122 is outputted to the third port 1223 of the SW22 switch 122 which, in turn, applies the optical signal to the second port 1132 of the SW13 switch 113. The optical signal inputted to the second port 1132 of the SW13 switch 113 is outputted to the third port 1133 of the SW13 switch 113. Thus, the optical signal is outputted to the second output port OUT2.

FIG. 2 is a block diagram illustrating an example of a conventional 8×8 optical switching device. This optical switching device has first through eighth input ports IN1 to IN8, and first through eighth output ports OUT1 to OUT8. The optical switching device includes 16 switches 211 to 244 arranged to have a 4×4 matrix array. Each of the switches 211 to 244 is connected to another switch arranged on the same row in the matrix array while being connected to another switch arranged on a row adjacent thereto or a row adjacent to the adjacent row in the matrix array. Each of the switches 211 to 244 has first and second ports at an input side thereof, and third and fourth ports at an output side thereof. Each switch is switched between a "cross" state and a "bar" state in accordance with a control signal from a control unit (not shown). The control unit controls the switches 211 to 244 in order to output an optical signal, inputted to an optional input port of the optical switching device, to an associated output port.

For example, for the case in which an optical signal is input to the first input port IN1 has to be outputted to the fifth output port OUT5 will be described hereinafter. In this case, the control unit maintains the SW12 switch 212 and SW33 switch 233 in their cross state, while maintaining the SW11 switch 211 and SW34 switch 234 in their bar state.

Accordingly, the optical signal input to the first input port IN1, that is, the first port 2111 of the SW11 switch 211, is output to the third port 2113 of the SW11 switch 211 which, in turn, applies the optical signal to the first port 2121 of the SW12 switch 212. The optical signal input to the first port 2121 of the SW12 switch 212 is output to the fourth port 2124 of the SW12 switch 212 which, in turn, applies the optical signal to the second port 2332 of the SW33 switch 233. The optical signal input to the second port 2332 of the SW33 switch 233 is output to the third port 2333 of the SW33 switch 233. In turn, the switch 233 applies the optical signal to the first port 2341 of the SW34 switch 234. The optical signal input to the first port 2341 of the SW34 switch 234 is output to the third port 2343 of the SW34 switch 234. Thus, the optical signal is output to the fifth output port OUT5.

As described above, the conventional optical switching devices implement an N×N optical switching device having N input ports and N output ports by using 2×2 switches as basic constitutive elements. However, where such an N×N optical switching device having the above mentioned arrangement is implemented, it is necessary to use a number of 2×2 optical switching elements. For example, where the 4×4 optical switching device shown in FIG. 1 is implemented, six 2×2 switches should be used. In other words, the conventional optical switching devices have a problem in that they have a complex configuration because a uniform connection method is used for connection of 2×2 switches, without taking into consideration the characteristics of those 2×2 switches, so that a number of 2×2 switches should be used to implement a desired N×N optical switching device.

Furthermore, the conventional optical switching devices involve high manufacturing costs because each 2×2 switch is implemented by a plurality of optical elements or an expensive integrated element.

SUMMARY OF THE INVENTION

Therefore, the present invention has been made view in with at least of the above mentioned problems involved with the related art, and an object of the invention is to provide an optical switching device which has a simplified configuration while being inexpensively manufactured by minimizing the number of its constitutive elements.

In accordance with the present invention, the present invention provides an optical switching device having a plurality of input ports, and a plurality of output ports e the optical switching device comprises: a plurality of circulators each having a plurality of ports while operating to output an optical signal, input to a higher-order port thereof, from a lower-order port thereof arranged adjacent to the higher-order port, each of the circulators being connected at a highest-order port thereof to an associated one of the input ports, at a lowest-order port thereof to an associated one of the output ports, and at each intermediate port thereof to a corresponding intermediate port of another one of the circulators; and a plurality of reflectors each adapted to reflect an optical signal, inputted thereto, or to allow the optical signal to pass there through, each of the reflectors being connected between two intermediate ports of every two of the circulators connected to each other at the two intermediate ports. An optical signal input to an associated one of the input ports is output to an associated one of the output ports via at least one of the circulators.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE PREFERRED EMBODIMENT

Preferred aspects of the present invention will be described in detail with reference to the annexed drawings. For the purposes of clarity and simplicity, a detailed description of known functions and configurations incorporated herein will be omitted as it may obscure the subject matter of the present invention.

The present invention provides an optical switching device including a plurality of circulators, and a plurality of reflectors. Each circulator has a plurality of ports. Where it is assumed that one circulator is designated by a reference numeral "###", its N-th port is designated by "N" in the drawings while being designated, in the following description, by a reference numeral "###N". The multiple reflectors will be described as being arranged to have a matrix array, for better understanding thereof. Also, each reflector is designated by its row number and its column number. For example, the reflector arranged on a first row and a first column is referred to as "R11 reflector", and the reflector arranged on a second row and a second column is referred to as "R22 reflector".

The multiple circulators included in the optical switching device according to the present invention may be connected in diverse fashions.

The following is one example of how a method for configuring an optical switching device having $2^n$ input ports (n is a natural number not less than 2) can be performed. It should be understood that a person of ordinary skill in the art knows that various modifications can be made to the following method steps that lie within the spirit of the invention and the scope of the appended claims.

At a first step, $2^n$ circulators, each circulator having at least n+2 ports are arranged such that they are vertically aligned with one another.

At a second step, the first port of the p-th circulator is connected to the p-th input port, whereas the "n+2"-th port of the p-th circulator is connected to the p-th output port. The second step is repeatedly executed from p=1 to p=$2^n$.

At a third step, a primary division is performed for the vertically-aligned circulators, so as to virtually divide the circulators into two groups, namely, primary upper and primary lower groups. Also, the "n+1"-th port of each circulator in the primary upper group is connected to the "n+1"-th port of a circulator in the primary lower group having the same order as that of the circulator in the primary upper group.

At a fourth step, an m-th division is performed for "m−1"-th upper and lower groups of the circulators, respectively, to virtually divide each of the "m−1"-th upper and lower groups into m-th upper and lower groups. Also, the "n+2−m"-th port of each circulator in each m-th upper group is connected to the "n+2−m"-th port of a circulator in the associated m-th lower group having the same order as that of the circulator in the m-th upper group. The fourth step is repeatedly executed from m=2 to m=n.

Figure 3:
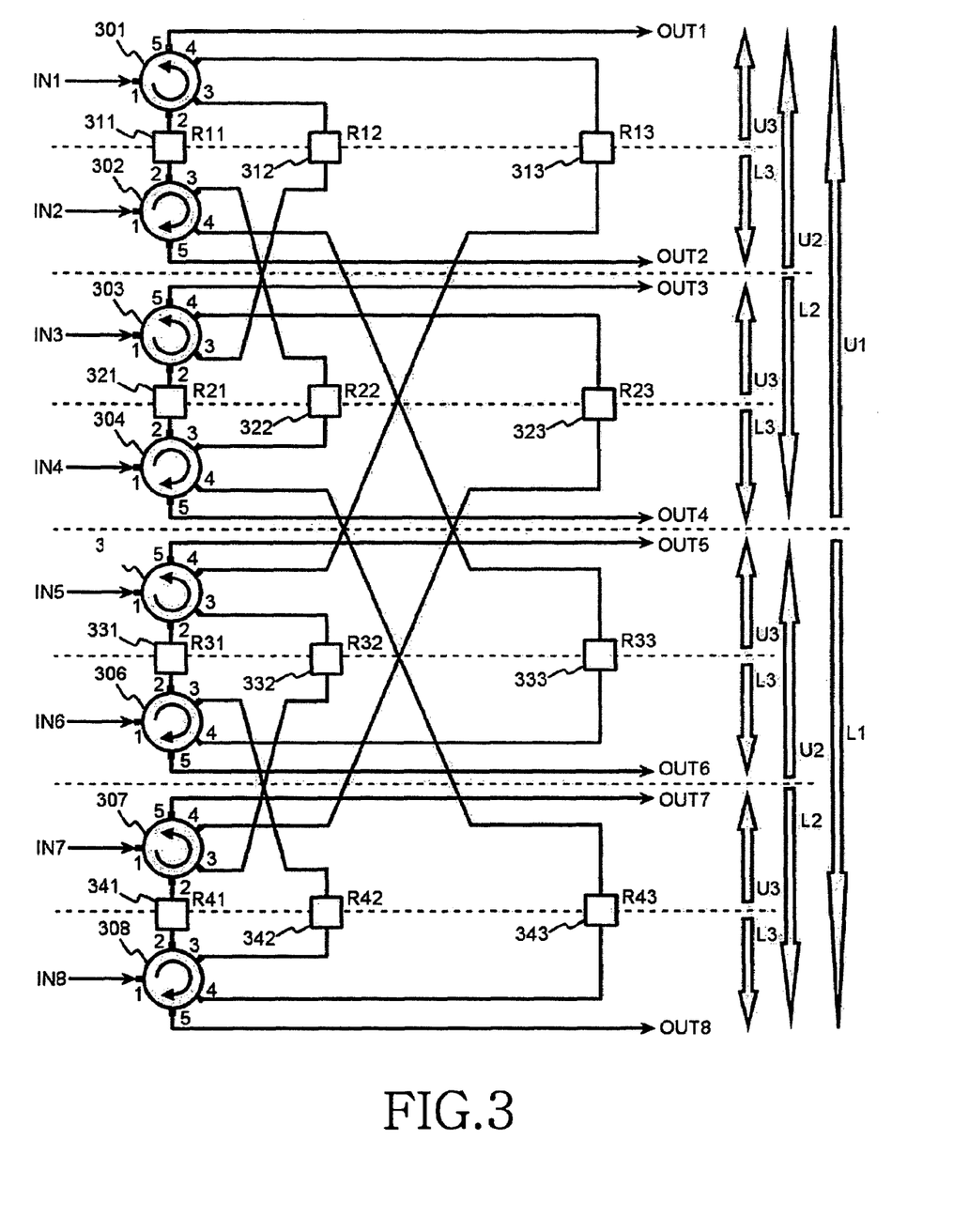
FIG. 3 is a diagram illustrating the arrangement of an optical switching device according to a first aspect the present invention.

At a fifth step, there is a reflector that is interposed between two ports of every two of the circulators connected to each other. FIG. 3 is a diagram illustrating the arrangement of an optical switching device according to a first aspect of the present invention. Now, the procedure for configuring the optical switching device shown in FIG. 3 in accordance with the above described configuration method will be described.

At step (a) first through $2^3$-th circulators 301 to 308 each having 3+2 ports are arranged such that they are vertically aligned with one another.

At step (b), the first port of a p-th one of the circulators 301 to 308 is connected to a p-th one of input ports IN1 to IN8, whereas the fifth port of the p-th circulator is connected to a p-th one of output ports OUT1 to OUT8. The connection process is repeatedly executed from p=1 to p=8. For example, the first port 3031 of the third circulator 303 is connected to the third input port IN3, whereas the fifth port 3035 of the third circulator 303 is connected to the third output port OUT3.

At step (c), a primary division is performed for the first through eighth circulators 301 to 308 to virtually divide the circulators 301 to 308 into two groups, namely, primary upper and primary lower groups U1 and L1. Also, the fourth port of each circulator in the primary upper group U1 is connected to the fourth port of a circulator in the primary lower group L1 having the same order as that of the circulator in the primary upper group U1. For example, the fourth port 3024 of the second circulator 302 is connected to the fourth port 3064 of the sixth circulator 306, whereas the fourth port 3044 of the fourth circulator 304 is connected to the fourth port 3084 of the eighth circulator 308.

At step (d), an m-th division is performed for "m−1"-th upper and lower groups of the circulators, respectively, so as to virtually divide each of the "m−1"-th upper and lower groups into m-th upper and lower groups. Also, the "5−m"-th port of each circulator in each m-th upper group is connected to the "5−m"-th port of a circulator in the associated m-th lower group having the same order as that of the circulator in the m-th upper group. The m-th division and connection processes are repeatedly executed from m=2 to m=3.

For example, as can be seen in FIG. 3, in the secondary division and connection processes, the third port 3023 of the second circulator 302 in one secondary upper group U2 is connected to the third port 3043 of the fourth circulator 304 in the associated secondary lower group L2 via reflector R22. Also, in the third division and connection processes, the second port 3052 of the fifth circulator 305 in one third upper group U3 is connected to the second port 3062 of the sixth circulator 306 in the associated third lower group L3.

At step (e), a reflector is interposed between two ports of every two of the circulators connected to each other at the two ports. For example, an R12 reflector 312 is connected between the third port 3013 of the first circulator 301 and the third port 3033 of the third circulator 303, whereas an R23 reflector 323 is connected between the fourth port 3034 of the third circulator 303 and the fourth port 3074 of the seventh circulator 307.

Figure 4:
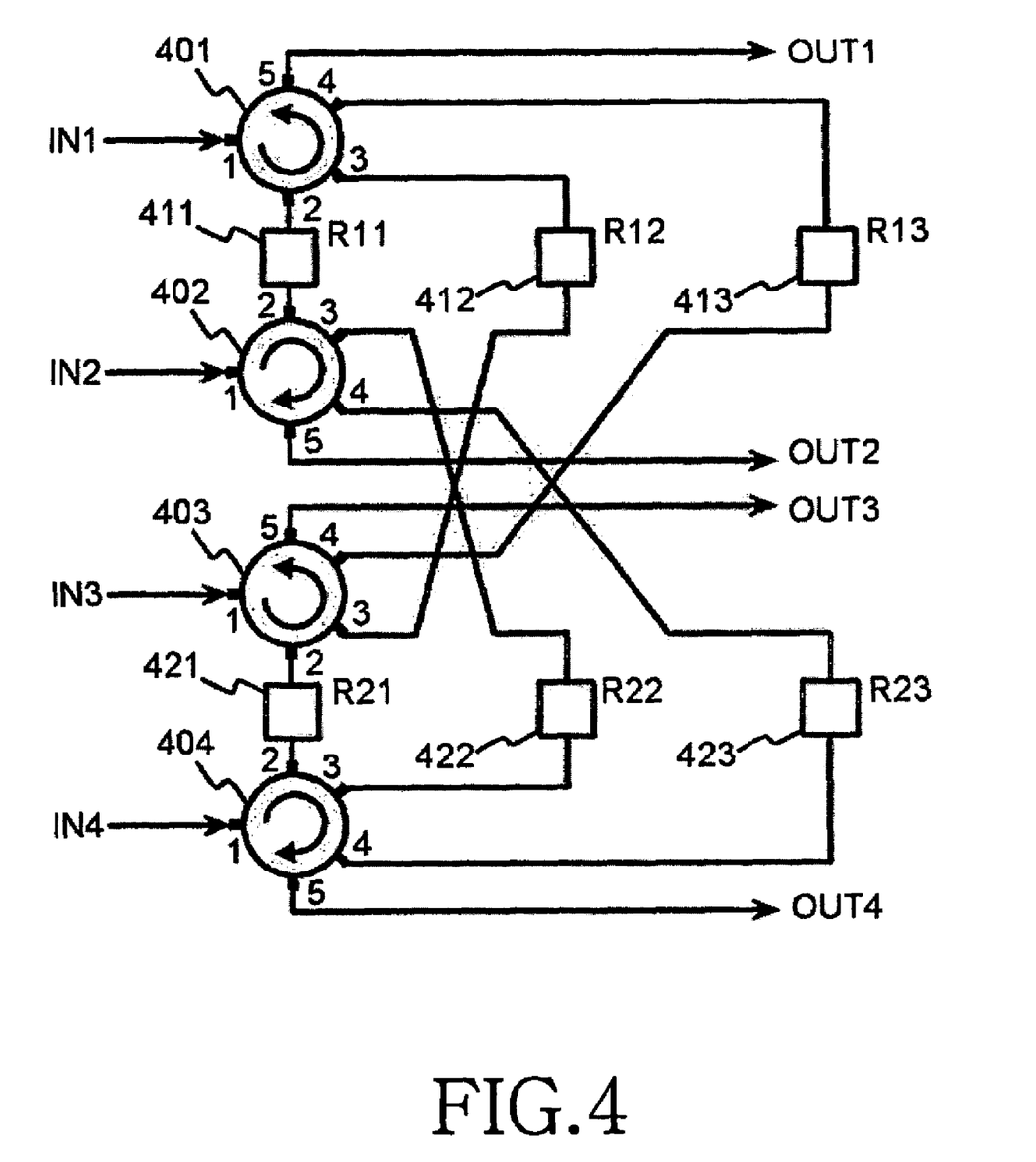
FIG. 4 is a diagram illustrating the arrangement of an optical switching device according to a aspect of the present invention.

FIG. 4 is a diagram illustrating the arrangement of an optical switching device according to a second aspect of the present invention. This optical switching device has first through fourth input ports IN1 to IN4, and first through fourth output ports OUT1 to OUT4. The optical switching device includes first through fourth circulators 401 to 404 that are vertically aligned with one another, and 6 reflectors 411 to 423.

Each of the circulators 401 to 404 has first through fifth ports, and operates to output an optical signal, input to a higher-order port thereof, to a lower-order port thereof arranged adjacent to the higher-order port. Thus, for multiple devices, there are multiple groups of ports. For example, the first circulator 401 outputs an optical signal, inputted to its first port 4011, to its second port 4012, while outputting an optical signal, inputted to its fourth port 4014, to its fifth port 4015. Respective first ports (highest-order ports) 4011, 4021, 4031, and 4041 of the first through fourth circulators 401 to 404 are connected to the first through fourth input ports IN1 to IN4.

On the other hand, the respective fifth group of ports (lowest-order ports) 4015, 4025, 4035, and 4045 of the first through fourth circulators 401 to 404 are connected to the first through fourth output ports OUT1 to OUT4. Each intermediate port of each of the circulators 401 to 404 is connected to a corresponding intermediate port of another circulator. For example, the first circulator 401 is connected at its second port 4012 to the second port 4022 of the second circulator 402, at its third port 4013 to the third port 4033 of the third circulator 403, and at its fourth port 4014 to the fourth port 4034 of the third circulator 403.

Each of the reflectors 411 to 423 is interposed between two intermediate ports of every two of the circulators 401 to 404 connected to each other at the two intermediate ports. Each of the reflectors 411 to 423 operates in accordance with an ON or OFF signal from a control unit (not shown) so that it reflects an optical signal, input thereto, in its ON state, while allowing the input optical signal to pass there through in its OFF state. Where each of the reflectors 411 to 423 has a wavelength dependency, its ON or OFF state may be changed in accordance with the wavelength of the inputted optical signal. Usable for each of the reflectors 411 to 423 is a bi-lateral reflector exhibiting a variation in transmittance or a variation in transmitting wavelength in accordance with a control signal applied thereto, or a fiber grating fabricated by forming a plurality of grating elements in an optical fiber.

One reason that a wavelength-independent bi-lateral reflector is used for each of the reflectors 411 to 423, is that there is an advantage in that no state change occurs in accordance with the wavelength of the inputted optical signal. On the other hand, where a wavelength-dependent optical fiber grating has a plurality of Bragg grating elements formed in an optical fiber is used for each of the reflectors 411 to 423, there is an advantage in that different paths can be set for optical signals of different wavelengths, respectively. That is, this case utilizes the characteristics of a wavelength-dependent reflector allowing an optical signal of a first wavelength to pass there through while reflecting an optical signal of a second wavelength there from. In accordance with such advantages, the optical switching device can be appropriately used as an optical cross-connect device in an optical communication network.

Now, operation of the above described optical switching device will be described in conjunction with the case of the output of an optical signal, inputted to the first input port IN1, to the second output port OUT2, and the case of outputting the optical signal to the fourth output port OUT4.

First, the case of outputting an optical signal that was input to the first input port IN1 and the second output port OUT2 will be described. In this case, the control unit maintains the R11 reflector 411 in its OFF state while maintaining the R22 reflector 422 and R23 reflector 423 in their ON state. In this state, the optical signal inputted to the first input port IN1 is first applied to the first port 4011 of the first circulator 401 which, in turn, outputs the optical signal at its second port 4012. Since the second port 4012 of the first circulator 401 is connected to the second port 4022 of the second circulator 402 via the R11 reflector 411 maintained in its OFF state, the optical signal from the second port 4012 of the first circulator 401 is transmitted to the second port 4022 of the second circulator 402 while passing through the R11 reflector 411. The second circulator 402 outputs the optical signal, inputted thereto, at its third port 4023 to which the R22 reflector 422 is connected. Since the R22 reflector 422 is maintained in its ON state, it reflects the optical signal output from the second circulator 402, so that the optical signal is secondarily input to the second circulator 402. The second circulator 402 then outputs the secondarily-inputted optical signal at its fourth port 4024 to which the R23 reflector 423 is connected. Since the R23 reflector 423 is maintained in its ON state, it reflects the optical signal outputted from the second circulator 402, so that the optical signal is thirdly inputted to the second circulator 402. The second circulator 402 then outputs the thirdly-inputted optical signal at its fifth port 4025 to which the second output port OUT2 is connected. Thus, the optical signal is outputted to the second output port OUT2.

Second, in the case of outputting the optical signal, which was first input to the first input port IN1, to the fourth output port OUT4 will be described. In this case, the control unit maintains the R11 reflector 411 and R22 reflector 422 in their OFF state while maintaining the R23 reflector 423 in its ON state. In this state, the optical signal inputted to the first input port IN1 is first applied to the first port 4011 of the first circulator 401 which, in turn, outputs the optical signal at its second port 4012. Since the second port 4012 of the first circulator 401 is connected to the second port 4022 of the second circulator 402 via the R11 reflector 411 maintained in its OFF state, the optical signal from the second port 4012 of the first circulator 401 is transmitted to the second port 4022 of the second circulator 402 while passing through the R11 reflector 411. The second circulator 402 outputs the optical signal, inputted thereto, at its third port 4023. Since the third port 4023 of the second circulator 402 is connected to the third port 4043 of the fourth circulator 404 via the R22 reflector 422 maintained in its OFF state, the optical signal from the third port 4023 of the second circulator 402 is transmitted to the third port 4043 of the fourth circulator 404 while passing through the R22 reflector 422. The fourth circulator 404 outputs the optical signal, inputted thereto, at its fourth port 4044 to which the R23 reflector 423 is connected. Since the R23 reflector 423 is maintained in its ON state, it reflects the optical signal outputted from the fourth circulator 404, so that the optical signal is secondarily inputted to the fourth circulator 404. The fourth circulator 404 then outputs the secondarily-inputted optical signal at its fifth port 4045 to which the fourth output port OUT4 is connected. Thus, the optical signal is outputted to the fourth output port OUT4.

Accordingly, the control unit can establish diverse paths for an optical signal, inputted to one port of the optical switching device, to be outputted to another port of the optical switching device, and can select a desired one of the established paths.

For example, where the optical signal inputted to the first input port IN1 of the optical switching device is to be outputted to the fourth output port OUT4, the control unit can select a path other than the above described path. This will now be described. In this particular case, the control unit maintains the R11 reflector 411 and R23 reflector 423 in their OFF state while maintaining the R22 reflector 422 in its ON state. In this particular state, the optical signal inputted to the first input port IN1 is first applied to the first port 4011 of the first circulator 401 which, in turn, outputs the optical signal at its second port 4012. Since the second port 4012 of the first circulator 401 is connected to the second port 4022 of the second circulator 402 via the R11 reflector 411 maintained in its OFF state, the optical signal from the second port 4012 of the first circulator 401 is transmitted to the second port 4022 of the second circulator 402 while passing through the R11 reflector 411. The second circulator 402 outputs the optical signal, inputted thereto, at its third port 4023 to which the R22 reflector 422 is connected. Since the R22 reflector 422 is maintained in its ON state, it reflects the optical signal outputted from the second circulator 402, so that the optical signal is secondarily inputted to the second circulator 402. The second circulator 402 then outputs the secondarily-inputted optical signal at its fourth port 4024. Since the fourth port 4024 of the second circulator 402 is connected to the fourth port 404 of the fourth circulator 404 via the R23 reflector 423 maintained in its OFF state, the optical signal from the fourth port 4024 of the second circulator 402 is transmitted to the fourth port 404 of the fourth circulator 404 while passing through the R23 reflector 423. The fourth circulator 404 then outputs the optical signal, inputted thereto, at its fifth port 4045 to which the fourth output port OUT4 is connected. Thus, the optical signal is outputted to the fourth output port OUT4.

Figure 5:
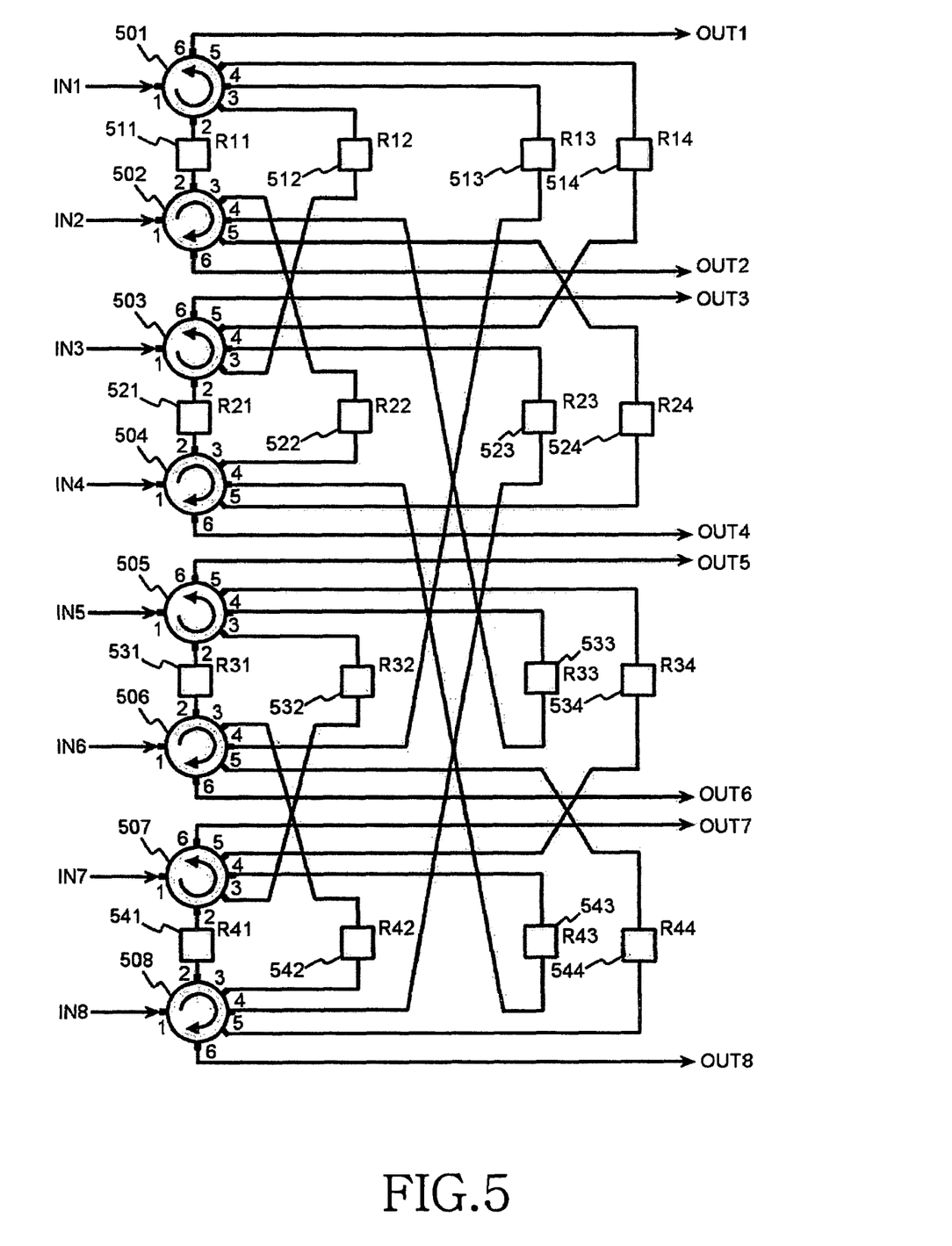
FIG. 5 is a diagram illustrating the arrangement of an optical switching device according to another aspect of the present invention.

FIG. 5 is a diagram illustrating the arrangement of an optical switching device according to a third preferred embodiment of the present invention. This optical switching device has first through eighth input ports IN1 to IN8, and first through eighth output ports OUT1 to OUT8. The optical switching device includes first through eighth circulators 501 to 508 vertically aligned with one another, and 16 reflectors 511 to 544.

Each of the circulators 501 to 508 has first through sixth ports, and operates to output an optical signal, inputted to a higher-order port thereof, to a lower-order port thereof arranged adjacent to the higher-order port.

For example, the first circulator 501 outputs an optical signal, that was input to its first port 5011, to its second port 5012, while outputting an optical signal, inputted to its fifth port 5015, to its sixth port 5016. Respective first ports (highest-order ports) 5011, 5021, 5031, 5041, 5051, 5061, 5071, and 5081 of the first through eighth circulators 501 to 508 are connected to the first through eighth input ports IN1 to IN8.

On the other hand, respective sixth ports (lowest-order ports) 5016, 5026, 5036, 5046, 5056, 5066, 5076, and 5086 of the first through eighth circulators 501 to 508 are connected to the first through eighth output ports OUT1 to OUT8. Each intermediate port of each of the circulators 501 to 508 is connected to a corresponding intermediate port of another circulator. For example, the first circulator 501 is connected at its second port 5012 to the second port 5022 of the second circulator 502, at its third port 5013 to the third port 5033 of the third circulator 503, at its fourth port 5014 to the fourth port 5064 of the sixth circulator 506, and at its fifth port 5015 to the fifth port 5035 of the third circulator 503.

Each of the reflectors 511 to 544 is interposed between two intermediate ports of every two of the circulators 501 to 508 connected to each other at the two intermediate ports. Each of the reflectors 511 to 544 operates in accordance with an ON or OFF signal from a control unit (not shown) so that it reflects an optical signal, inputted thereto, in its ON state, while allowing the inputted optical signal to pass there through in its OFF state.

Now, operation of the above described optical switching device will be described in conjunction with the case of outputting an optical signal input to the first input port IN1, to the second output port OUT2, and the case of outputting the optical signal to the eighth output port OUT8.

First, the case of outputting an optical signal, inputted to the first input port IN1, to the second output port OUT2 will be described. In this case, the control unit maintains the R11 reflector 511 in its OFF state while maintaining the R22 reflector 522, R24 reflector 524, and R33 reflector 533 in their ON state. In this state, the optical signal inputted to the first input port IN1 is first applied to the first port 5011 of the first circulator 501 which, in turn, outputs the optical signal at its second port 5012. Since the second port 5012 of the first circulator 501 is connected to the second port 5022 of the second circulator 502 via the R11 reflector 511 maintained in its OFF state, the optical signal from the second port 5012 of the first circulator 501 is transmitted to the second port 5022 of the second circulator 502 while passing through the R11 reflector 511. The second circulator 502 outputs the optical signal, inputted thereto, at its third port 5023 to which the R22 reflector 522 is connected. Since the R22 reflector 522 is maintained in its ON state, it reflects the optical signal outputted from the second circulator 502, so that the optical signal is secondarily inputted to the second circulator 502. The second circulator 502 then outputs the secondarily-inputted optical signal at its fourth port 5024 to which the R33 reflector 533 is connected. Since the R33 reflector 533 is maintained in its ON state, it reflects the optical signal outputted from the second circulator 502, so that the optical signal is thirdly inputted to the second circulator 502. The second circulator 502 then outputs the third-inputted optical signal at its fifth port 5025 to which the R24 reflector 524 is connected. Since the R24 reflector 524 is maintained in its ON state, it reflects the optical signal outputted from the second circulator 502, so that the optical signal is fourthly inputted to the second circulator 502. The second circulator 502 then outputs the fourthly-inputted optical signal at its sixth port 5026 to which the second output port OUT2 is connected. Thus, the optical signal is outputted to the second output port OUT2.

Second, the case of outputting the optical signal, inputted to the first input port IN1, to the eighth output port OUT8 will be described. In this case, the control unit maintains the R13 reflector 513 and R44 reflector 544 in their OFF state while maintaining the R11 reflector 511 and R12 reflector 512 in its ON state. In this state, the optical signal inputted to the first input port IN1 is first applied to the first port 5011 of the first circulator 501 which, in turn, outputs the optical signal at its second port 5012 to which the R11 reflector 511 is connected. Since the R11 reflector 511 is maintained in its ON state, it reflects the optical signal outputted from the first circulator 501, so that the optical signal is secondarily inputted to the first circulator 501. The first circulator 501 then outputs the secondarily-inputted optical signal at its third port 5013 to which the R12 reflector 512 is connected. Since the R12 reflector 512 is maintained in its ON state, it reflects the optical signal outputted from the first circulator 501, so that the optical signal is thirdly inputted to the first circulator 501. The first circulator 501 then outputs the thirdly-inputted optical signal at its fourth port 5014. Since the fourth port 5014 of the first circulator 501 is connected to the fourth port 5064 of the sixth circulator 506 via the R13 reflector 513 maintained in its OFF state, the optical signal from the fourth port 5014 of the first circulator 501 is transmitted to the fourth port 5064 of the sixth circulator 506 while passing through the R13 reflector 513. The sixth circulator 506 outputs the optical signal, inputted thereto, at its fifth port 5065. Since the fifth port 5065 of the sixth circulator 506 is connected to the fifth port 5085 of the eighth circulator 508 via the R44 reflector 544 maintained in its OFF state, the optical signal from the fifth port 5065 of the sixth circulator 506 is transmitted to the fifth port 5085 of the eighth circulator 508 while passing through the R44 reflector 544. The eighth circulator 508 then outputs the optical signal at its sixth port 5086 to which the eighth output port OUT8 is connected. Thus, the optical signal is outputted to the eighth output port OUT8.

The control unit can establish multiple diverse paths for an optical signal, inputted to one port of the optical switching device, to be outputted to another port of the optical switching device, and can select a desired one of the established paths.

For example, where the optical signal inputted to the first input port IN1 of the optical switching device is to be outputted to the eighth output port OUT8, the control unit can select a path other than the above described path. This will now be described. In this case, the control unit maintains the R12 reflector 512 and R23 reflector 523 in their OFF state while maintaining the R11 reflector 511 and R44 reflector 544 in their ON state. In this state, the optical signal inputted to the first input port IN1 is first applied to the first port 5011 of the first circulator 501 which, in turn, outputs the optical signal at its second port 5012 to which the R11 reflector 511 is connected. Since the R11 reflector 511 is maintained in its ON state, it reflects the optical signal outputted from the first circulator 501, so that the optical signal is secondarily inputted to the first circulator 501. The first circulator 501 then outputs the secondarily-inputted optical signal at its third port 5013. Since the third port 5013 of the first circulator 501 is connected to the third port 5033 of the third circulator 503 via the R12 reflector 512 maintained in its OFF state, the optical signal from third port 5013 of the first circulator 501 is transmitted to the third port 5033 of the third circulator 503 while passing through the R12 reflector 512. The third circulator 503 outputs the optical signal, inputted thereto, at its fourth port 5034. Since the fourth port 5034 of the third circulator 503 is connected to the fourth port 5084 of the eighth circulator 508 via the R23 reflector 523 maintained in its OFF state, the optical signal from the fourth port 5034 of the third circulator 503 is transmitted to the fourth port 5084 of the eighth circulator 508 while passing through the R23 reflector 523. The eighth circulator 508 outputs the optical signal, inputted thereto, at its fifth port 5085 to which the R44 reflector 544 is connected. Since the R44 reflector 544 is maintained in its ON state, it reflects the optical signal outputted from the eighth circulator 508, so that the optical signal is secondarily input to the eighth circulator 508. The eighth circulator 508 then outputs the secondarily-inputted optical signal at its sixth port 5086 to which the eighth output port OUT8 is connected. Thus, the optical signal is outputted to the eighth output port OUT8.

As apparent from the above description, the present invention provides an optical switching device which is configured only with circulators and reflectors, so that it has a simplified configuration, as compared to conventional devices.

The optical switching device according to the present invention has the capability to establish multiple diverse paths of an optical signal, using circulators each having a multi-port structure, and reflectors. Accordingly, there are advantages in that it is possible to reduce the number of constitutive elements and the manufacturing costs, as compared to conventional switching devices.

While this invention has been described in connection with what is presently considered to be the most practical and preferred embodiment, it is to be understood that the invention is not limited to the disclosed embodiment, but, on the contrary, it is intended to cover various modifications within the spirit and scope of the appended claims.

What is claimed is:

1. An optical switching device having a plurality of input ports, and a plurality of output ports, the optical switching device comprising:

a plurality of circulators each having four or more ports while operating to output an optical signal, inputted to a higher-order port thereof, to a lower-order port thereof arranged adjacent to the higher-order port, each of the circulators being connected at a highest-order port thereof to an associated one of the input ports, at a lowest-order port thereof to an associated one of the output ports, and at each intermediate port thereof to a corresponding intermediate port of another one of the circulators; and a plurality of reflectors each adapted to reflect an optical signal, inputted thereto, or to allow the optical signal to pass there through, each of the reflectors being connected between two intermediate ports of every two of the circulators connected to each other at the two intermediate ports, wherein an optical signal input to an associated one of the input ports is output to an associated one of the output ports via at least one of the circulators.

2. The optical switching device according to claim 1, wherein each of the reflectors is a wavelength-independent bi-lateral reflector.

3. The optical switching device according to claim 1, wherein each of the reflectors is a wavelength-dependent optical grating.

4. The optical switching device according to claim 1, wherein each of the circulators are aligned vertically.

5. An optical switching device having a plurality of input ports, and a plurality of output ports, the optical switching device comprising:

a plurality of circulators each having a plurality off our or more ports while operating to output an optical signal, inputted to a higher-order port thereof, to a lower-order port thereof arranged adjacent to the higher-order port, each of the circulators being connected at a highest-order port thereof to an associated one of the input ports, at a lowest-order port thereof to an associated one of the output ports, and at each intermediate port thereof to a corresponding intermediate port of another one of the circulators;

a plurality of reflectors each adapted to reflect an optical signal, inputted thereto, or to allow the optical signal to pass there through, each of the reflectors being connected between two intermediate ports of every two of the circulators connected to each other at the two intermediate ports;

a optical signal input to an associated one of the input ports is output to an associated one of the output ports via at least one of the circulators; and a controller, wherein said controller independently controls each respective reflector of the plurality of reflectors on to reflect, or off to allow the passage of light there through, according to a desired path.

6. The optical switching device according to claim 5, wherein said controller is programmed with a plurality of paths through said optical switch to permit passage from a particular input port to a particular output port.

* * * * *